(12) United States Patent
Sykes

(10) Patent No.: US 6,237,731 B1
(45) Date of Patent: May 29, 2001

(54) PARKING BRAKE ACTUATING ASSEMBLY WITH BRAKE CABLE POSITIONING BRACKET

(75) Inventor: Michael Sykes, Orangeville (CA)

(73) Assignee: Ventra Group Inc., Tottenham (CA)

( * ) Notice: Subject to any disclaimer, the term of this patent is extended or adjusted under 35 U.S.C. 154(b) by 0 days.

(21) Appl. No.: 09/414,602

(22) Filed: Oct. 8, 1999

Related U.S. Application Data

(60) Provisional application No. 60/103,597, filed on Oct. 9, 1998.

(51) Int. Cl.$^7$ .................................................. F16D 65/14
(52) U.S. Cl. .................. 188/204 R; 188/2 D; 74/501.5; 74/502.4; 74/502.6; 74/512; 74/535; 74/536
(58) Field of Search .............................. 188/2 D, 2 A, 188/24.15, 24.16, 24.21, 24.22, 204 A, 204 R; 74/501.5 R, 502.4, 502.6, 512, 535, 536

(56) References Cited

U.S. PATENT DOCUMENTS

| | | |
|---|---|---|
| 1,629,647 | 5/1927 | Anderson . |
| 3,100,323 | 8/1963 | Baker . |
| 3,901,610 | 8/1975 | Mason . |
| 4,057,127 | 11/1977 | Woodring . |
| 4,412,458 | 11/1983 | Derringer . |
| 4,428,613 | 1/1984 | Nomura . |
| 4,480,720 | 11/1984 | Shimano . |
| 4,569,112 | 2/1986 | Dussault . |
| 4,850,241 | 7/1989 | Buckley et al. . |
| 4,914,971 | 4/1990 | Hinkens et al. . |
| 5,016,490 | 5/1991 | Jaksic . |
| 5,138,898 | 8/1992 | Pospisil et al. ................ 74/502.6 |
| 5,203,068 | * 4/1993 | Siring ........................... 74/501.5 |
| 5,217,094 | 6/1993 | Walter et al. . |
| 5,219,044 | 6/1993 | Siring ............................ 188/2 D |
| 5,277,081 | 1/1994 | Brown . |
| 5,315,893 | 5/1994 | Behrens et al. . |
| 5,484,039 | 1/1996 | Singleton et al. . |
| 5,813,290 | 9/1998 | Takahashi et al. . |
| 5,816,109 | 10/1998 | Dege . |
| 5,907,977 | 6/1999 | Huebner et al. . |
| 5,910,194 | 6/1999 | Cho . |
| 5,927,895 | * 7/1999 | Watanabe ....................... 74/502.6 |
| 5,992,264 | * 10/1999 | Brock, Sr. ...................... 74/502.6 |

FOREIGN PATENT DOCUMENTS

| | | |
|---|---|---|
| 2429665 | 1/1976 | (DE) . |
| 2214257 | 8/1989 | (GB) . |
| 54-104128 | 8/1979 | (JP) . |
| 3-21555 | 1/1991 | (JP) . |
| 9-254770 | * 9/1997 | (JP) . |

* cited by examiner

Primary Examiner—Robert J. Oberleitner
Assistant Examiner—Thomas J. Williams
(74) Attorney, Agent, or Firm—Pillsbury Winthrop LLP

(57) ABSTRACT

The present invention relates to a parking brake actuating assembly for installation in the passenger compartment of a motor vehicle. More particularly, the present invention relates to a parking brake actuating assembly that has a brake positioning bracket for properly positioning brake cables relative to cable receiving portions of a brake equalizer.

8 Claims, 4 Drawing Sheets

PARKING BRAKE ACTUATING ASSEMBLY WITH BRAKE CABLE POSITIONING BRACKET

The present application claims priority from U.S. Provisional Application of Sykes, Ser. No. 60/103,597, filed Oct. 9, 1998, the entirety of which is hereby incorporated into the present application by reference.

FIELD OF THE INVENTION

The present invention relates to a parking brake actuating assembly for installation in the passenger compartment of a motor vehicle. More particularly, the present invention relates to a parking brake actuating assembly that has a brake positioning bracket for properly positioning brake cables relative to cable receiving portions of a brake equalizer.

BACKGROUND OF THE INVENTION

Conventionally, during the assembly of motor vehicles the rear brake cables are attached to a parking brake actuating assembly at the automotive final assembly plant because the rear cables must be mounted to the chassis or frame whereas the actuating assembly is mounted above the floor pan member in the vehicle's passenger compartment to facilitate its access by the driver. To attach the brake cables to the actuating assembly, the cables must be advanced up from beneath the floor pan member and then be inserted into cable receiving portions of an equalizer. The equalizer is connected to the manually operable actuator (which may be a hand lever or a foot pedal) of the actuating assembly by a single actuator cable and distributes the tension applied to the actuator cable by operation of the actuator to the two brake cables to affect actuation of the vehicle brakes.

Connecting the cables to the equalizer normally requires an assembly line worker to move the cables up through the floor pan member from below the vehicle, and then move to the inside of the passenger compartment to make the connection between the cable ends and the equalizer. Forcing the worker to undertake these two installation steps instead of one is an inefficiency that it would be desirable to obviate. The problems associated with installing and connecting these brake cables can be amplified in situations where the assembly line procedures require the console that covers the components of the actuating assembly to be installed before connecting the brake cables. In this situation, the worker has no direct access to the equalizer and must "blindly" connect the cable ends to the equalizer. That is, the worker must make this connection based on feel and experience rather than by sight.

To alleviate this blind installation problem, U.S. Pat. Nos. 5,219,044 and 5,203,068, both to Siring, disclose an equalizer that has a pair of slots with enlarged open ends. The slots guide the heads of the brake cables (and hence the brake cables themselves) into proper installed positions within the equalizer interior. However, the equalizers disclosed in these two patents have a number of drawbacks. First, the equalizers of these two patents fasten to the vehicle floor and require the additional step of manually releasing the equalizer to allow its movement to tension the installed brake cables. Another drawback is that the equalizer is intended to entirely replace existing equalizers rather than supplement them. As a result, the teachings of these patents cannot be used to help manufacturers improve brake cable connection efficiency without entirely changing equalizers.

Consequently, there exists a need in the art for a parking brake actuating assembly in which the blind installations problems discussed above are overcome without the drawbacks associated with the constructions disclosed in the two above-mentioned Siring patents.

SUMMARY OF THE INVENTION

It is therefore an object of the present invention to meet the need described above. To achieve this object, the present invention provides a parking brake actuating assembly for installation in a passenger compartment of a motor vehicle. The motor vehicle has a floor pan member that provides the passenger compartment with a generally upwardly facing floor surface. The vehicle also comprises a pair of brakes that are actuated to prevent vehicle wheel rotation by applying tension to a pair of brake cables. These cables each extend below the floor pan and connect to a respective one of the brakes. Each of these brake cables have an enlarged head at an end thereof opposite its associated brake.

The parking brake actuating assembly of the present invention comprises a manually operable parking brake actuator that mounts in the passenger compartment above the floor surface of the floor pan member to enable a vehicle driver to operate the parking brake actuator. A brake equalizer also mounts above the floor surface of the floor pan member and has first, second, and third cable receiving portions. The second and third cable receiving portions each provide surfaces that define a cable receiving space which is configured to receive a respective one of the pair of brake cables. An actuator cable has a first end portion that connects to the first cable receiving portion of the brake equalizer and a second end portion that connects to the parking brake actuator so that operation of the actuator applies tension to the actuator cable to move the equalizer in a brake actuating direction. The assembly also comprises a brake cable positioning bracket that mounts in the passenger compartment above the floor surface of the floor pan member adjacent the equalizer. The brake cable positioning bracket has a first cable guiding portion positioned adjacent to the second cable receiving portion of the equalizer and a second cable guiding portion adjacent to the third cable receiving portion of the equalizer.

Each of the first and second cable guiding portions provide a pair of spaced apart guiding surfaces. The distance between the guiding surfaces is wide enough to permit each brake cable to pass therebetween, yet narrow enough to prevent the enlarged head of each brake cable from passing therebetween. The brake cable positioning bracket is positioned with respect to the equalizer such that a first brake cable of the pair can be moved from below the floor pan member and towards the second cable receiving portion of the equalizer. During this movement, the enlarged head thereof engages the guiding surfaces of the first cable guiding portion and flexes the first cable generally away from the second cable receiving portion. Then, the first cable can be further moved until the enlarged head thereof moves beyond both the second cable receiving portion of the equalizer and the guiding surfaces of the first cable guiding portion, thereby allowing the first cable to resiliently return towards the second cable receiving portion to an initially installed position wherein the first brake cable is received in the second cable receiving portion. The same operation can be performed with a second brake cable of the pair so that the second cable is positioned in a similar initially installed position within the third cable receiving portion of the equalizer.

The equalizer is constructed and arranged such that, after moving the brake cables to the initially installed positions thereof as described above, the installation of the brake cables can be completed by tensioning the actuator cable so as to move the equalizer in the brake actuating direction thereof relative to the brake positioning bracket. This equalizer movement causes surfaces on the second and third cable receiving portions to engage underside surfaces of the enlarged heads to initially tension the brake cables. As a result, operation of the actuator thereafter applies further tension to the actuator cable, which in turn moves the equalizer in the brake actuating direction and applies further tension to both the brake cables to cause actuation of the vehicle brakes.

Other objects, features, and advantages of the present invention will become apparent from the following detailed description, the accompanying drawings, and the appended claims.

DETAILED DESCRIPTION OF THE PREFERRED EMBODIMENT OF THE INVENTION

Figure 1:
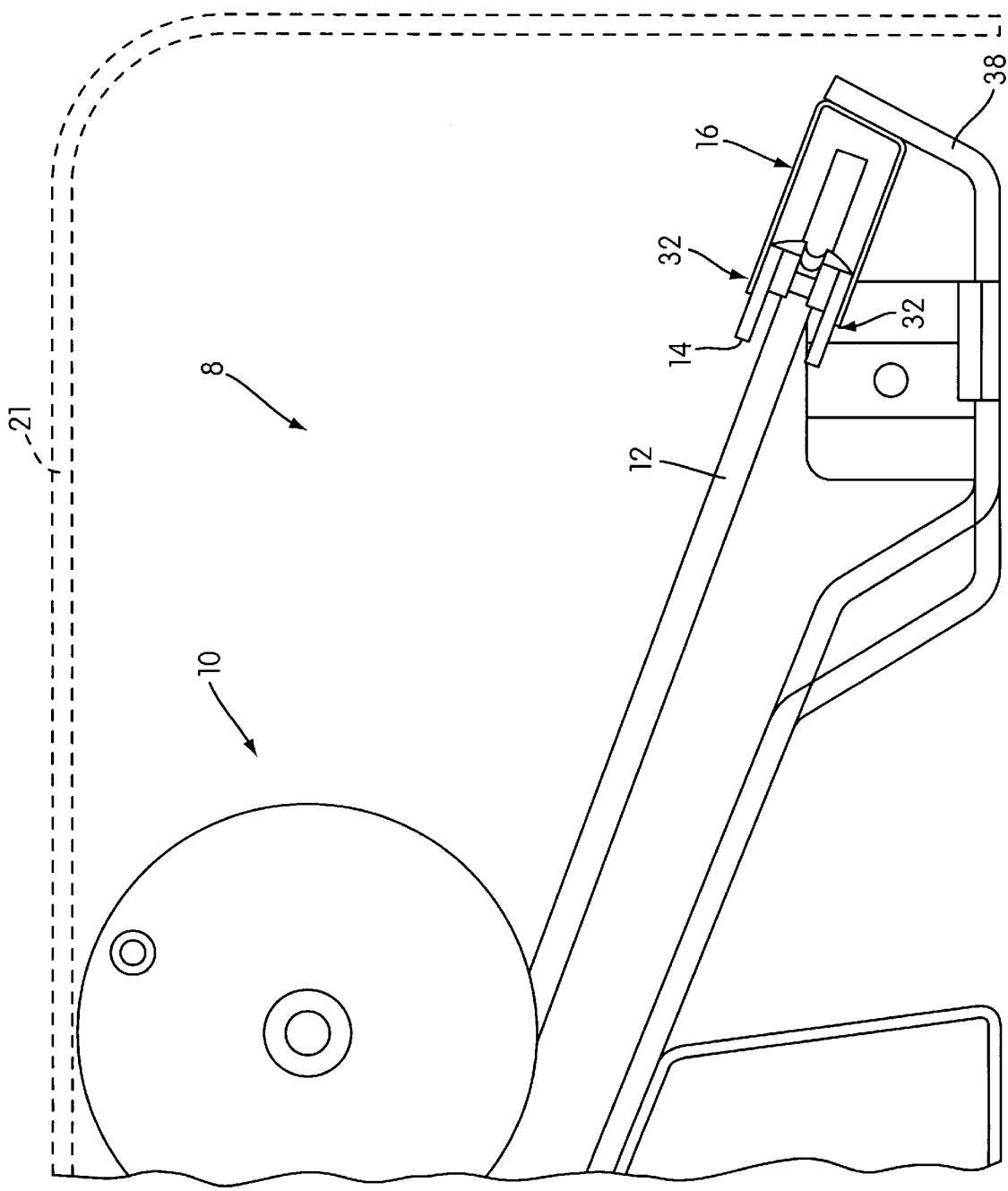
FIG. 1 is a side elevational view of a parking brake actuating assembly showing the front actuator cable attached to the equalizer, with a brake cable positioning bracket positioned adjacent to the equalizer in accordance with the principles of the present invention.

FIG. 1 shows a parking brake actuating assembly, generally indicated at 8, constructed in accordance with the principles of the present invention. The assembly 8 comprises a manually operated parking brake actuator, generally indicated at 10, in the form of a pivoting hand brake lever, a front brake cable 12 connected at one end portion to the actuator 10, an equalizer 14 having a first cable receiving portion 15 to which the opposite end portion of the actuator cable 12 is connected, and a brake cable positioning bracket 16 positioned adjacent the equalizer 14. When the cable 12 is tightened, operation of the parking brake actuator 10 (i.e., pivoting movement of the hand lever) applies tension to the cable 12 and causes the same to move the equalizer 14 in a brake actuating direction (which is generally right to left as viewed in FIG. 1).

Equalizers are well known in the automotive industry and thus the specific construction of equalizer 14 will not be detailed herein. It should be noted, however, that the equalizer 14 may be of any suitable construction and the present invention is not limited to any specific type of equalizer 14.

The parking brake actuator 10, the actuator cable 12, the equalizer 14, and the positioning bracket 16 each mount within the vehicle's passenger compartment above the floor pan member that provides the passenger compartment with a generally upwardly facing floor surface. Specifically, each of these components is carried by a mounting bracket 38 that is positioned on the floor surfaces of the floor pan member and secured in place by fasteners or the like. The positioning bracket 16 is fixedly secured to the mounting bracket 38 by bolts, fasteners or the like and the equalizer 14 is movable relative to the positioning bracket 16. A console 21, shown schematically in FIG. 1, covers the equalizer 14, the bracket 16, and the lower half of the actuator 10. The console 21 is secured to the floor pan member or the mounting bracket 38 by bolts, retaining clips, or the like. The console 21 has an upwardly opening slot that allows the lever of the actuator 10 to extend outwardly therefrom for manual operation.

The vehicle into which the assembly 8 of the present invention is being installed has a pair of brakes that can be actuated to prevent rotation of the vehicle wheels associated with the brakes and hence rolling movement of the vehicle. These brakes are usually the brakes on the rear wheels of the vehicle. A pair of brake cables 40 extend below the floor pan member of the vehicle. Each of these brake cables 40 is connected at one end portion thereof to a respective one of the brakes such that applying a sufficient amount of tension or otherwise pulling on the brake cables actuates the brakes. The end portion of each brake cable 40 opposite its associated brake has an enlarged head 42 that is of greater diameter than the cable itself. During installation, these cables 40 are inserted upwardly from below the floor pan member through one or two openings formed in the floor pan member and also through the two openings 44, 46 formed in the bottom of the mounting bracket 38.

Because the present invention concerns the manner in which the cables 40 are installed and connected to the parking brake actuating assembly 8, and in particular their connection to the equalizer 14, rather than the construction of the brakes and wheels, the brakes and wheels are not depicted in the Figures. The constructions of such vehicle wheels and brakes are well known in the art and will not be detailed herein.

The equalizer 14 has second and third cable receiving portions 17, 19 defined by both flanges 17b, 19b that extend outwardly from opposing sides of the equalizer body and generally circular apertures 17c, 19c that extend through the equalizer body and open laterally towards the adjacent flange 17b, 19b. These flanges 17b, 19b and apertures 17c, 19c provide surfaces that define respective cable receiving spaces 17a, 19a that open generally upwardly and are configured to receive the brake cables 40 therein. However, the opening for each of these spaces 17a, 19a between the flanges 17b, 19b and the equalizer body is narrow enough to prevent ingress of the enlarged heads 42 carried by the ends of the brake cables 40. Further, the diameter of the apertures 17c, 19c is smaller than the enlarged head 42 to prevent its passage therethrough.

Figure 3:
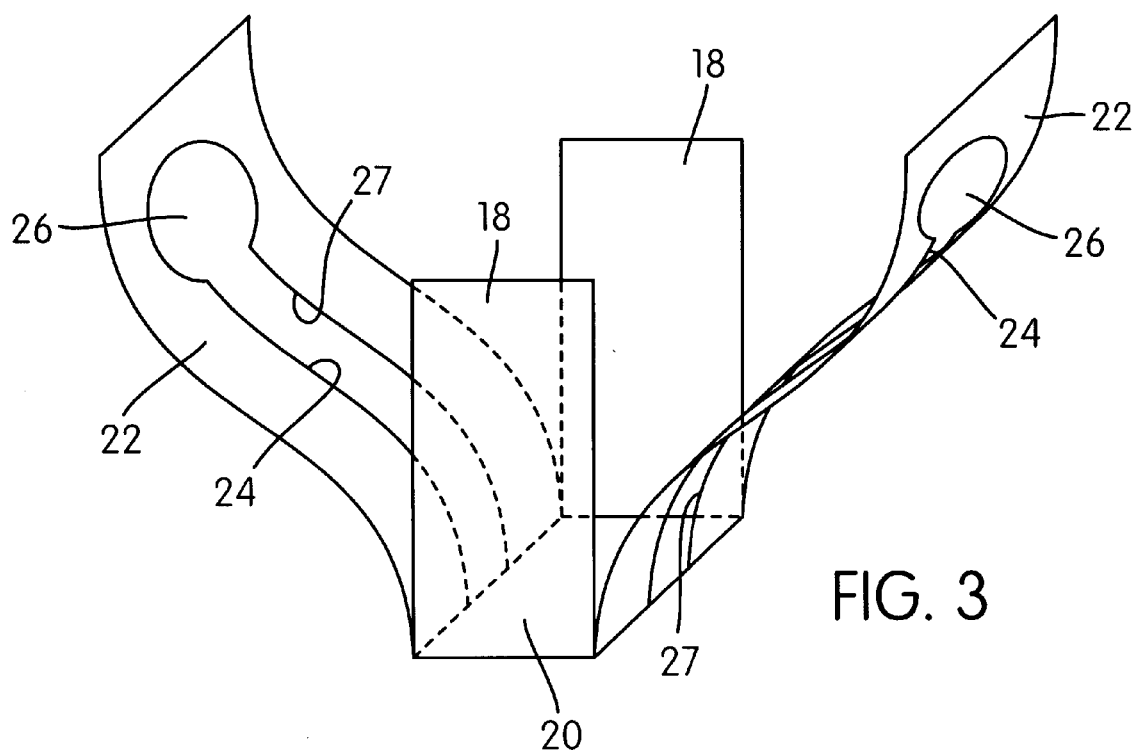
FIG. 3 is a perspective view of a brake cable positioning bracket provided in accordance with the present invention.

In the illustrated embodiment, the brake cable positioning bracket 16 includes a pair of generally flat side walls 18, a base wall 20, and first and second cable guiding portions 22 that are provided by a pair of opposed wings. In the embodiment of FIG. 3, a key-shaped slot 24 is defined in each of the wings 22. Each of these slots has an enlarged opening 26 defined at a distal portion thereof. The edges of the slot 24 provide each guiding portion 22 with spaced apart guiding surfaces 27 that terminate at the point where the enlarged opening 26 begins. The distance between the surfaces 27 is wide enough to permit a brake cable 40 to pass therebetween, yet narrow enough to prevent such passage of an enlarged head 42. However, the enlarged opening 26 provided at the distal end of these guiding surfaces 27 is wide enough to allow either the head 42 or the cable 40 to pass therethrough.

Figure 4:
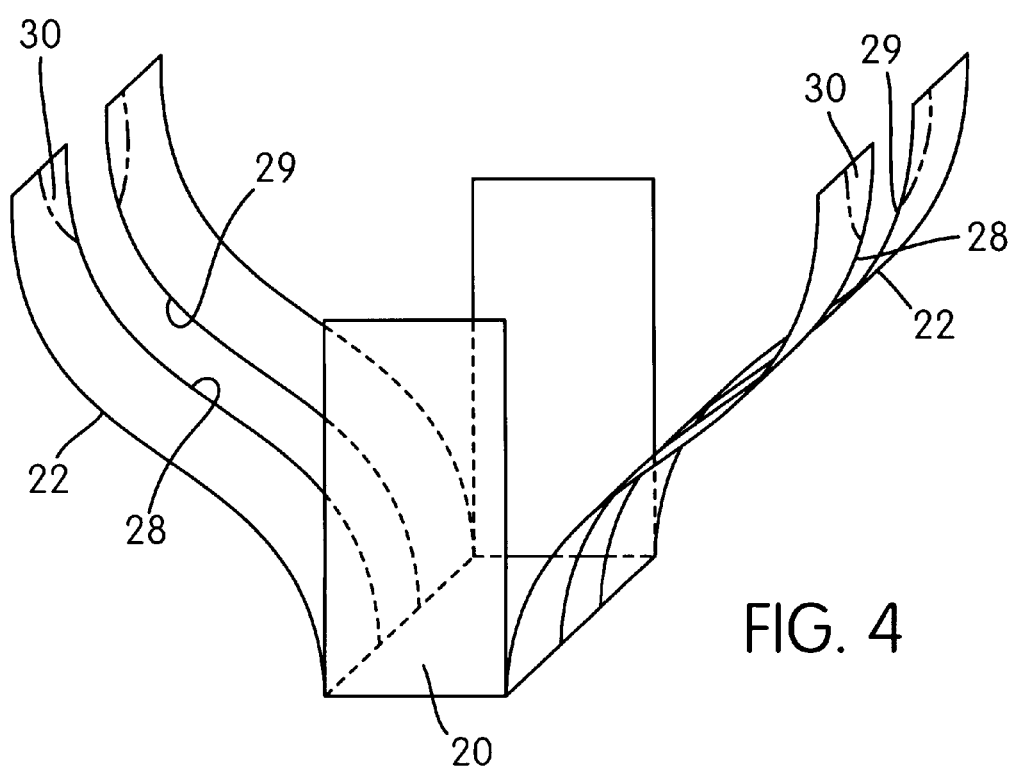
FIG. 4 is a perspective view of a brake cable positioning bracket provided in accordance with another embodiment of the present invention.
Figure 5:
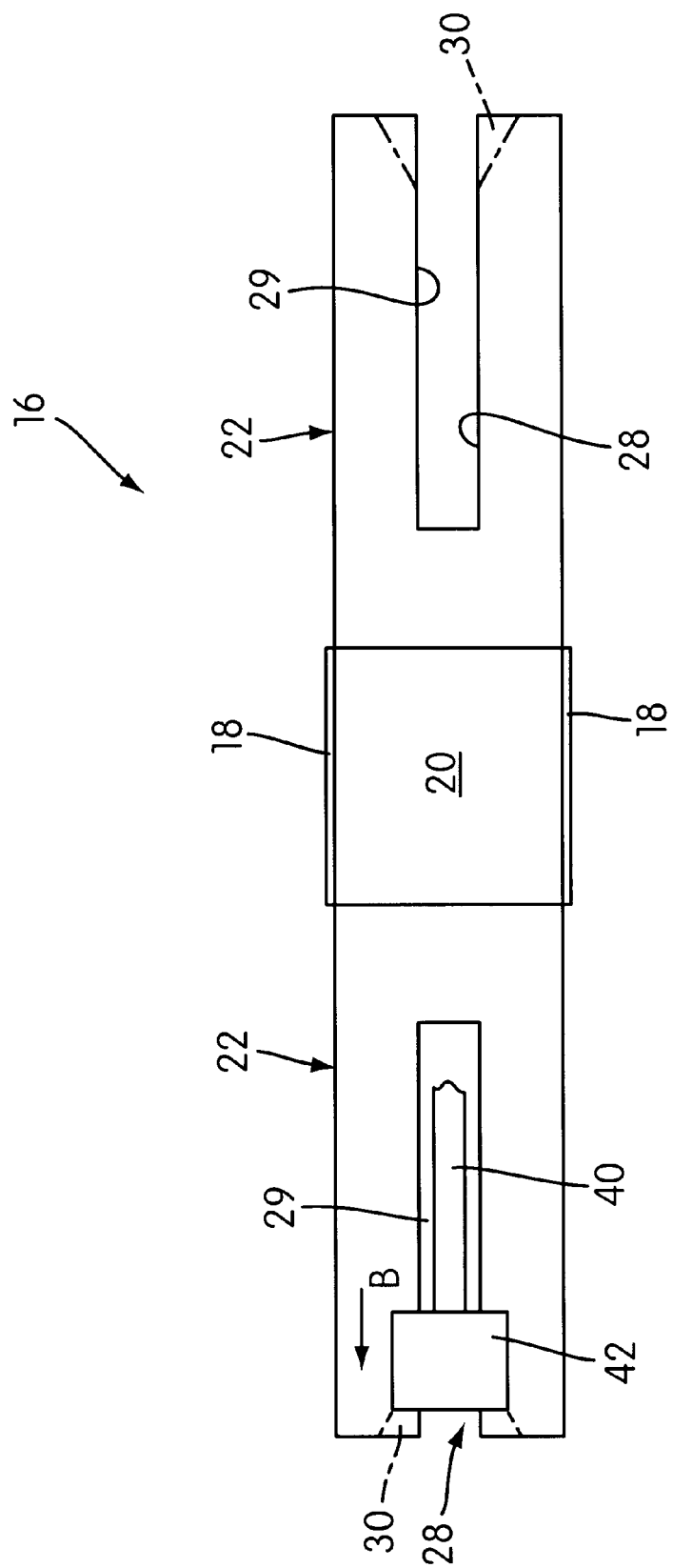
FIG. 5 is a top view of the brake cable positioning bracket provided in accordance with the invention showing a rear brake cable with an enlarged head during the assembly process.

In a second embodiment, each wing 22 has an opened slot 28 defined therein, the edges 29 of which may be generally parallel, and which terminates at a slot opening at the distal end (FIGS. 4 and 5). The edges 29 of the slot 28 provide the wings 22 (i.e., the guiding portions) with the above-mentioned guiding surfaces. The slot 28 may be of uniform width along its entire length as shown in solid lines or may have a flared end 30 as shown in phantom lines. As with the embodiment of FIG. 3, the width of the slot 28 is sufficient to permit the brake cable 40 to pass therethrough, but not the enlarged head 42.

In the embodiment shown in FIG. 1, the generally flat side walls 18 of the stabilizing bracket may include a projecting portion 32 for engaging the side walls 34 of the equalizer 14. A complementary recessed portion or detent may be defined on the side walls 34 of the equalizer 14 so that the equalizer 14 is releaseably held in the stabilizer bracket 16 until the actuator cable 12 is tensioned with sufficient force to overcome the engagement and move the equalizer 14 in the brake actuating direction.

Figure 2:
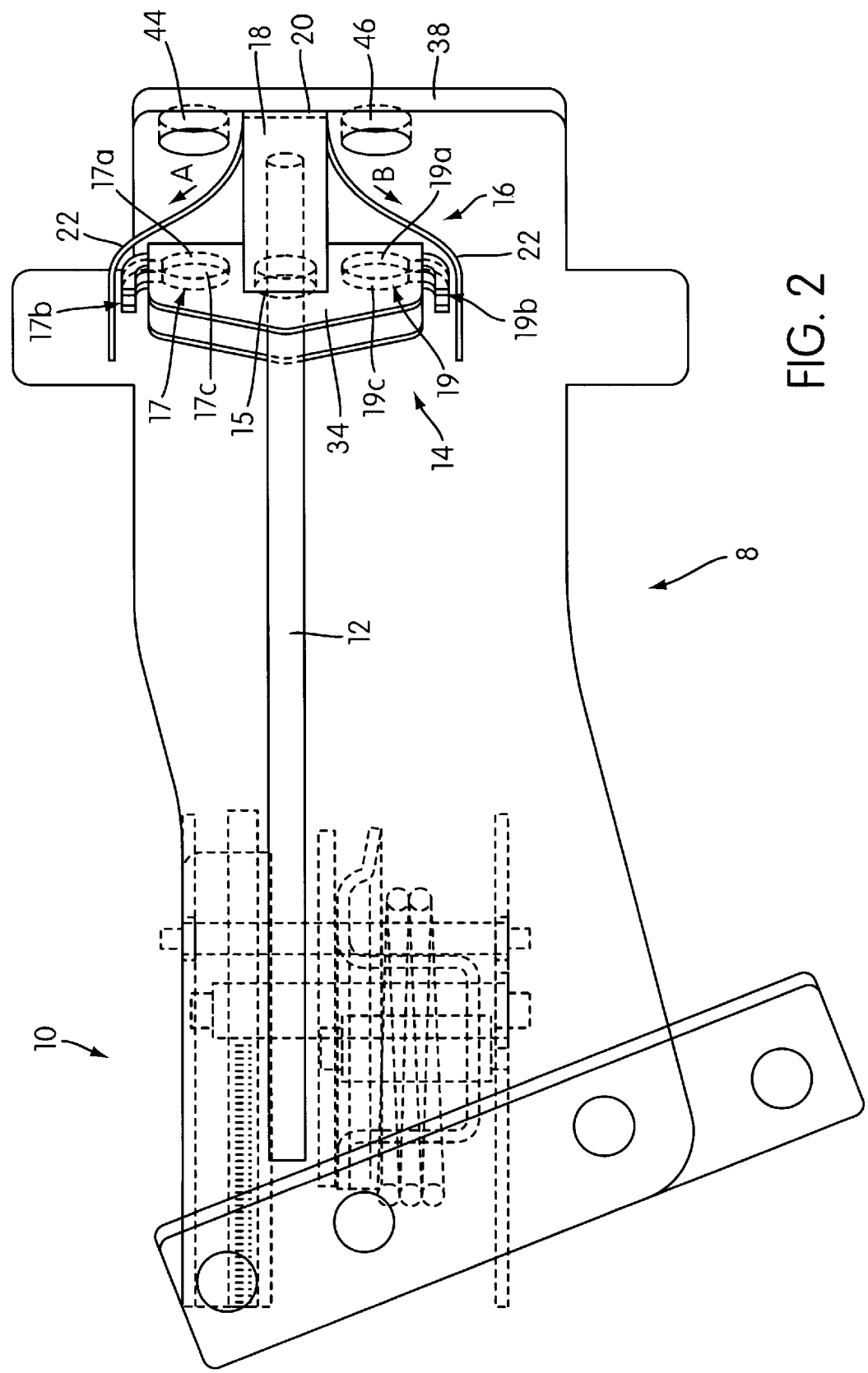
FIG. 2 is a top plan view of the parking brake actuating assembly including the equalizer and the brake cable positioning bracket.

With reference to FIGS. 2 and 5, the rear brake cables, one of which is schematically shown at 40 in FIG. 5, are coupled or connected to the equalizer 14 as follows. First, at the manufacturing facility, the parking brake actuating assembly 8 is constructed with the actuator 10, the equalizer 14, and the positioning bracket 16 mounted to the bracket 38. The equalizer 14 is removably or releasably seated between the wings 22 of the positioning bracket 16 as shown in FIG. 2. Then, the parking brake assembly 8 is shipped or otherwise transported to an automotive assembly plant.

At the automotive assembly plant, a partially completed motor vehicle is moved down an assembly line to a station whereat the parking brake assembly 8 is installed into the passenger compartment of the vehicle and connected to the brake cables 40. As mentioned above, these brake cables 40 extend below the floor pan member of the vehicle from the brakes. Specifically, during the assembly operations occurring prior to the vehicle reaching the present station, the brake cables 40 were connected to either the vehicle chassis system or the vehicle frame system and the floor pan member has been secured in place over the both the chassis and frame systems.

The brake cables 40 with the enlarged heads 42 thereon are fed generally upwardly from below the floor pan member respectively through the two holes 44, 46 provided in the mounting bracket 38. The brake cables 40 are fed in a direction generally parallel to the actuator cable 12 and generally towards the second and third cable receiving portions 17, 19 of the equalizer 14. As a result of this movement, the enlarged head 42 of a first of the cables engages the edges 27 of the first wing 22. This engagement causes the head 42 to slide along the edges 27 of the slot 24 and flex the cable in direction A generally away from the second cable receiving portion 17. Then, the first brake cable 40 can be further moved until the enlarged head 42 thereof moves beyond both the second cable receiving portion 17 and the slot edges 27 of the first wing 22. As the head 42 moves beyond the ends of the slot edges 27, the first cable is allowed to resiliently return towards the second cable receiving portion 17 to an initially installed position wherein the first brake cable 40 is received in the cable receiving space 17a of the second cable receiving portion 17. As the cable 40 moves into its initially installed position, it moves inwardly and downwardly into the receiving space opening defined between the flange 17b and the equalizer body. The flange 17b guides the cable 40 downwardly into the appropriate aperture 17c of the equalizer body, which aperture 17c defines a part of the cable receiving space 17a.

Also as a result of this movement, the enlarged head 42 of a second of the cables 40 engages the slot edges 27 of the second wing 22. This engagement causes the head 42 to slide along the edges 27 of the slot 24 and flex the cable in direction B generally away from the third cable receiving portion 19. Then, the second brake cable 40 can be further moved until the enlarged head 42 thereof moves beyond both the third cable receiving portion 19 and the slot edges 27 of the second wing 22. As the head 42 moves beyond the ends of the slot edges 27, the second cable 40 is allowed to resiliently return towards the third cable receiving portion 19 to an initially installed position wherein the second brake cable 40 is received in the cable receiving space 19a of the third cable receiving portion 19. As the cable 40 moves into its initially installed position, it moves inwardly and downwardly into the receiving space opening defined between the flange 19b and the equalizer body. The flange 19b guides the cable 40 downwardly into the appropriate aperture 19c of the equalizer body, which aperture 19c defines a part of the cable receiving space 19a.

The key hole 26 in the embodiment of FIG. 3 or the open end of the slot 28 in the embodiment of FIGS. 4 and 5 allows the enlarged head 42 of the its associated brake cable 40 to enter the positioning bracket 16 only after it has moved beyond both its associated cable receiving portion 17, 19 and the edges 27, 29 of the slots 24, 28. Because the brake cables 40 are each being fed parallel to the front cable 12, the rear cable "wants" to be parallel to the brake cable 12. Thus, although the rear brake cable/enlarged head is deflected by slot edges 27, 29 on the bracket wings 22, once the cable 40 is advanced such that the head 42 reaches the key hole 26 or a portion of the slot 28 otherwise wide enough to accommodate passage of the head 42, the rear brake cable will tend to resiliently return to its disposition parallel to the front cable 12.

The positioning of the bracket 16 with respect to the cable receiving portions 17, 19 of the equalizer 14 ensures that the brake cables 40 will move into the respective cable receiving spaces 17a, 19a as a result of the cables' resilient returning movement that occurs after the heads 42 move beyond the slot edges 27, 29. Thus, each brake cable is effectively positioned in an initially installed position within its respective cable receiving space 17a, 19a as a result of using the bracket 16.

The equalizer 14 is constructed and arranged such that, after moving the cables 40 into the partially installed positions thereof as described above, the installation of the brake cables 40 can be completed by tensioning the actuator cable 12 so as to move the equalizer 14 in the brake actuating direction thereof relative to the brake positioning bracket 16. This movement of the equalizer causes surfaces on the cable receiving portions 17, 19 to engage underside surfaces of the enlarged heads 42 on the brake cables 40 so as to initially tension the cables 40. Specifically, the surfaces surrounding the equalizer apertures 17c, 19c engage the underside surfaces of the enlarged head 42. At this point, operation of the actuator 10 will apply further tension to the actuator cable 12, which in turn moves the equalizer 14 in the brake actuating direction and applies further tension to the brake cables 40 to cause actuation of the vehicle brakes.

During the installation of the parking brake actuating assembly, the console 21 may be mounted in place either before or after the brake cables 40 have been connected to the equalizer 14. In the situation where the brake cables 40 are connected to the equalizer after the console 21 has been installed, the use of the positioning bracket greatly increases the ease and efficiency of connecting the brake cables 40.

However, it is also contemplated to use the positioning bracket 16 in situations where the console 21 is not installed until after the brake cables 40 have been connected to the equalizer 14 in order to allow the worker to move the brake cables 40 into their initially installed positions while remaining underneath the vehicle. This obviates the inefficient step of moving onto the passenger compartment to properly connect the cables 40 to the equalizer 14.

It is to be understood that the floor pan member has one or two access holes for permitting the brake cables 40 to be inserted upwardly from below the floor pan member. These access holes may be positioned immediately adjacent the holes 44, 46 of the mounting bracket 38 or distal from the holes 44, 46 of the mounting bracket towards the rear end of the passenger compartment. In the arrangement where the floor pan hole(s) are immediately adjacent the mounting bracket holes 44, 46 the installer should be able to see the mounting bracket holes 44, 46 from beneath the vehicle through the floor pan holes, thus making installation a relatively simple operation. In the arrangement where the floor pan hole(s) are distal from the mounting bracket holes 44, 46, a pair of rigid or flexible conduits that extend between the floor pan hole(s) and the mounting bracket holes 44, 46 may be provided along the floor surface of the floor pan member. These conduits function to guide the brake cables into the holes 44, 46 of the mounting bracket 28 as the installer feeds them from beneath the vehicle. The use of a rigid conduit is preferred so that it does not become compressed by vehicle occupants as they step thereon. A rigid conduit is also preferred because it will not collapse under vehicle carpet pressure during repair situations wherein the brake cable has to be withdrawn and replaced by a new brake cable. That is, because most vehicle carpets fit rather snugly on the vehicle floor, withdrawal of the cable may allow the carpet to compress the flexible conduit, thereby making it difficult to feed the new cable back into place.

It can thus be appreciated that the objects of the present invention have been fully and effectively accomplished. It should be understood, however, that the foregoing preferred embodiment has been provided to illustrate the structural and functional principles of the present invention and is not intended to be limiting. To the contrary, the present invention is intended to encompass all changes, modifications, and alterations within the spirit and scope of the appended claims.

What is claimed:

1. A parking brake actuating assembly for installation in a passenger compartment of a motor vehicle, the motor vehicle having a floor pan that provides the passenger compartment with a generally upwardly facing floor surface, the motor vehicle having a pair of brakes that are actuated to prevent vehicle wheel rotation and hence rolling movement of said vehicle by applying tension to a pair of brake cables that each extend below the floor pan and that each connect to a respective one of said brakes, each of said brake cable having an enlarged head at an end thereof opposite its associated brake, said parking brake actuating assembly comprising:

a manually operable parking brake actuator that mounts in said passenger compartment above the floor surface of said floor pan member to enable a vehicle driver to operate said parking brake actuator;

a brake equalizer that mounts above the floor surface of said floor pan member, said brake equalizer having first, second, and third cable receiving portions, said second and third cable receiving portions each providing surfaces that define a cable receiving space that is configured to receive a respective one of said pair of brake cables;

an actuator cable having a first end portion that connects to the first cable receiving portion of said brake equalizer and a second end portion opposite said first end portion that connects to said parking brake actuator so that operation of said actuator applies tension to said actuator cable to move said equalizer in a brake actuating direction;

a brake cable positioning bracket that mounts in said passenger compartment above the floor surface of said floor pan member adjacent said equalizer, said brake cable positioning bracket having a first cable guiding portion positioned adjacent to the second cable receiving portion of said equalizer and a second cable guiding portion adjacent to the third cable receiving portion of said equalizer;

each of said first and second cable guiding portions providing a pair of spaced apart guiding surfaces, the distance between said guiding surfaces being wide enough to permit the cable of each brake cable to pass therebetween yet narrow enough to prevent the enlarged head of each brake cable from passing therebetween;

said brake cable positioning bracket being positioned with respect to said equalizer such that (a) a first brake cable of said pair can be moved from below said floor pan member and towards the second cable receiving portion of said equalizer so that the enlarged head thereof engages the guiding surfaces of said first cable guiding portion and flexes said first cable generally away from said second cable receiving portion, and (b) then said first cable can be further moved until the enlarged head thereof moves beyond both the second cable receiving portion of said equalizer and the guiding surfaces of said first cable guiding portion, thereby allowing said first cable to move under its own resiliency towards said second cable receiving portion to an initially installed position wherein said first brake cable is received in said second cable receiving portion;

said brake cable positioning bracket being positioned with respect to said equalizer such that (a) a second brake cable of said pair can be moved from below said floor pan member and towards the third cable receiving portion of said equalizer so that the enlarged head thereof engages the guiding surfaces of said second cable guiding portion and flexes said second cable generally away from said third cable receiving portion, and (b) then said second cable can be further moved until the enlarged head thereof moves beyond both the third cable receiving portion of said equalizer and the guiding surfaces of said second cable guiding portion, thereby allowing said second cable to move under its own resiliency towards said third cable receiving portion to an initially installed position wherein said second brake cable is received in said third cable receiving portion;

said equalizer being constructed and arranged such that, after moving said brake cables to the initially installed positions thereof, the installation of said brake cables can be completed by tensioning said actuator cable so as to move said equalizer in the brake actuating direction thereof relative to said brake positioning bracket, thus causing surfaces on said second and third cable receiving portions to engage underside surfaces of the enlarged heads on the brake cables to initially tension said brake cables whereby operation of said actuator thereafter applies further tension to said first cable which moves said equalizer in the brake actuating direction and applies further tension to both said brake cables to cause actuation of the vehicle brakes.

2. A parking brake actuating assembly according to claim 1, wherein said second and third cable receiving portions each comprise an aperture formed through said equalizer, each of said apertures providing surfaces that define at least part of said cable receiving spaces.

3. A parking brake actuating assembly according to claim 2, wherein said brake cable positioning bracket comprises first and second wings that provide said bracket with the first and second guiding portions thereof, respectively, said first and second wings each having a slot with opposing edges formed therein, said opposing edges of said slots providing the guiding surfaces of said guiding portions.

4. A parking brake actuating assembly according to claim 3, wherein said equalizer has a pair of flanges provided on opposing lateral sides thereof, each of said apertures of said equalizer having a laterally extending slot that opens towards an adjacent one of said flanges so that said brake cables pass between said equalizer and said flanges and through said laterally extending slots as they move under their own resiliency towards and into the initially installed positions thereof.

5. A parking brake actuating assembly according to claim 1, further comprising a mounting bracket that mounts to the floor surface of the floor pan member, said actuator and said brake cable positioning bracket being fixedly mounted to said mounting bracket.

6. A parking brake actuating assembly according to claim 1, wherein said brake cable positioning bracket comprises first and second wings that provide said bracket with the first and second guiding portions thereof, respectively, said first and second wings each having a slot with opposing edges formed therein, said opposing edges of said slots providing the guiding surfaces of said guiding portions.

7. A parking brake actuating assembly according to claim 1, wherein said actuator comprises a pivotally mounted hand brake lever.

8. A parking brake actuating assembly according to claim 1, wherein said equalizer and said positioning bracket have structures that engage one another in a complementary relationship to releasably retain said equalizer in a fixed position relative to said positioning bracket until after tension has been applied to said actuator cable as aforesaid.

* * * * *